United States Patent [19]

Meguro et al.

[11] 4,036,694
[45] July 19, 1977

[54] PROCESS FOR BEET SUGAR PRODUCTION

[75] Inventors: Shinichi Meguro, Tokyo; Shinsaku Imafuku; Kazuo Kawamura, both of Kitami; Shigeki Hashimoto, Tokyo; Shigeyoshi Narita, Kitami, all of Japan

[73] Assignee: Hokkaido Sugar Co., Ltd., Tokyo, Japan

[21] Appl. No.: 616,133

[22] Filed: Sept. 23, 1975

[30] Foreign Application Priority Data

Sept. 28, 1974 Japan .................... 49-110991

[51] Int. Cl.$^2$ .................... C12B 1/00; C13J 1/04
[52] U.S. Cl. .................... 195/11; 127/47; 127/56
[58] Field of Search .................... 195/11; 127/47, 56

[56] References Cited

U.S. PATENT DOCUMENTS

| 3,767,526 | 10/1973 | Suzuki | 195/11 |
| 3,844,835 | 10/1974 | Duchateau | 127/47 |

*Primary Examiner* — Sidney Marantz
*Attorney, Agent, or Firm* — Oblon, Fisher, Spivak, McClelland & Maier

[57] ABSTRACT

Beet juice is purified, then concentrated and treated in several steps for boiling and centrifugal separation to effect recovery of sucrose therefrom. The molasses remaining after the separation of sucrose from massecuite is treated with $\alpha$-galactosidase to effect hydrolysis of raffinose present in the molasses. The resultant raffinose hydrolyzate is introduced into a calcium saccharate-forming step, wherein quicklime is continuously added to the hydrolyzate to form saccharate within the hydrolyzate. From the calcium saccharate-forming step, nearly the same volume of the saccharate-containing solution as that of the raffinose hydrolyzate fed therein is forwarded to a filtering and washing step. The resultant saccharate cake is sent back to the step for purification. From said calcium saccharate-forming step, the same saccharate-containing solution is also withdrawn in a volume of from three to ten times that of said raffinose hydrolyzate fed therein, is cooled and thereafter returned to the calcium saccharate-forming step. The saccharate-containing solution is circulated several times through this step so that discharge of waste molasses is eliminated and the sucrose contained in the beet juice is efficiently recovered substantially in its entire amount.

6 Claims, 1 Drawing Figure

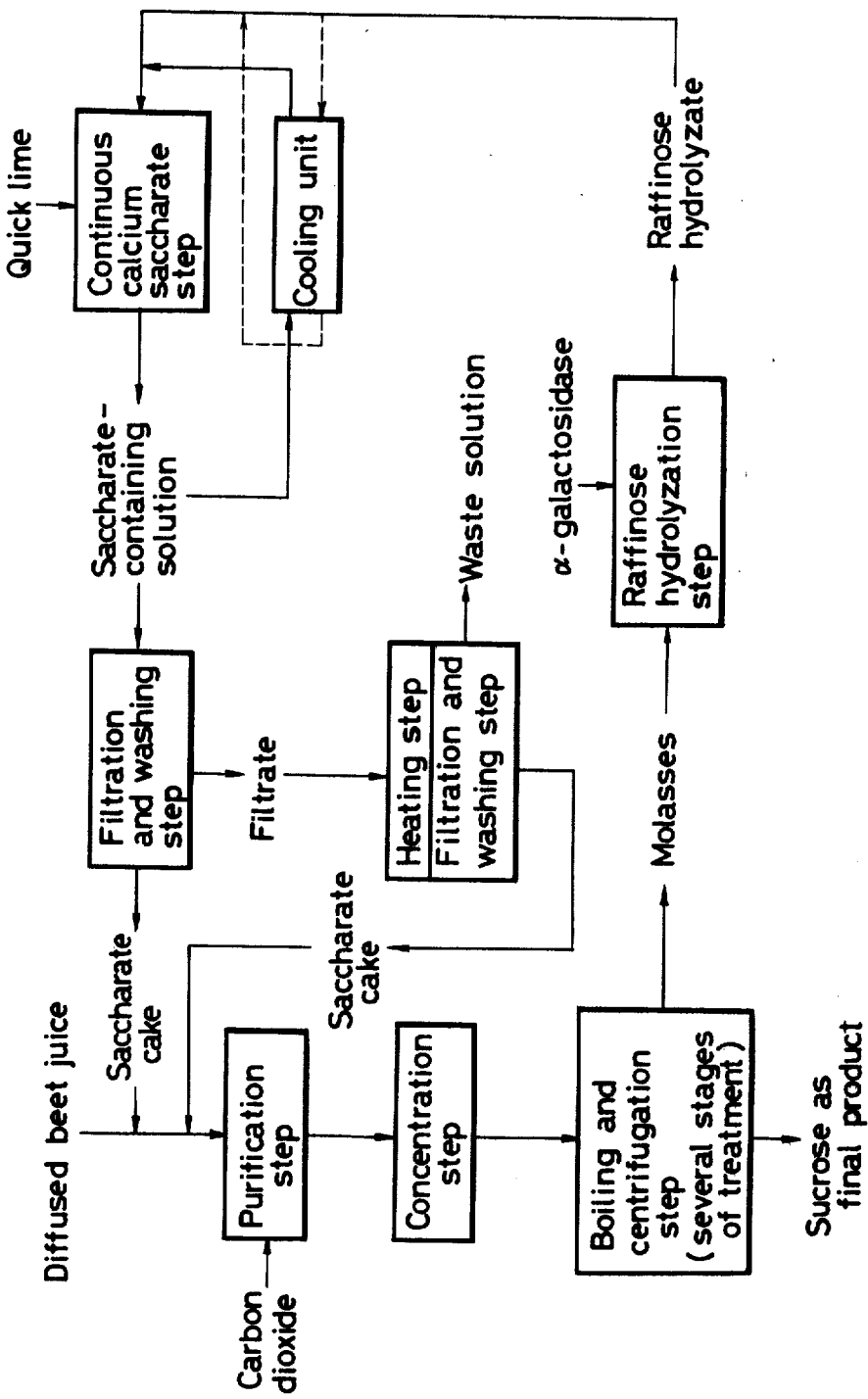

PROCESS FOR BEET SUGAR PRODUCTION

BACKGROUND OF THE INVENTION

This invention relates to an improved process for beet sugar production.

In a beet sugar factory using the calcium saccharate process, the sucrose contained in the beet juice is obtained as a product by purifying said beet juice in a purification step, then concentrating the purified beet juice, subjecting the concentrated beet juice to a plurality of stages of boiling and centrifugation thereby crystallizing sucrose, and finally recovering the sucrose crystals thus educed. The molasses resulting from the separation of sucrose from the massecuite is diluted and them mixed with quicklime to have the residual sucrose in the molasses combined with quicklime and produce a saccharate. The saccharate thus formed is separated in the form of a cake from the mother liquor. The separated saccharate cake is returned to the purification step, wherein it is treated in conjunction with the fresh beet juice, with the subsequent recovery of sucrose effected in the boiling and centrifugal separation step.

Generally the calcium saccharate process is practiced in a batchwise operation which comprises diluting the molasses to a sugar concentration (polarization) of 6%, cooling the diluted molasses to a temperature below 15° C, agitating the molasses and simultaneously incorporating therein quicklime thereby causing precipitation of saccharate, and separating the saccharate formed from the mother liquor.

Recently, a continuous calcium saccharate process has been suggested by Raffinerie Tirlemontoise S.A. of Belgium to take the place of the batchwise calcium saccharate process described above. This continuous process comprises feeding and agitating molasses diluted to a sugar content (polarization) of 6 to 20%, and quicklime in a reactor provided with an agitator to produce calcium saccharate, forwarding the saccharate-containing solution to the subsequent step and, at the same time, withdrawing from the reactor the saccharate-containing solution in a volume three to ten times that of the molasses being delivered to the reactor, cooling the withdrawn solution and thereafter returning the cooled solution to the reactor in conjunction with the fresh supply of molasses and quicklime. Characteristic features of this continuous process include, for example, the fact that the molasses can be subjected to treatment in a concentration higher than the attainable in the batchwise process; the fact that quicklime remaining unreacted can be utilized to advantage; as well as the fact that the treatment of molasses can be effected continuously. The saccharate produced achieves a remarkable growth, the particles measuring from 30 to 40μm as compared with only 1 to 2μm obtainable by the batchwise process. Consequently, the saccharate displays improved filterability. Accordingly, the saccharate cake obtained after the filtering and washing treatments has an enhanced true sucrose purity. Consequently, the impurities returned in conjunction with the saccharate cake to the purification step are proportionally lowered, with the result that the ratio at which sucrose is recovered in the boiling and centrifugal separation step is notably improved as compared with the batchwise process.

The beet juice, however, contains raffinose which impedes crystallization of sucrose. The raffinose is present at all times through the entire process of sucrose manufacture. During the step for the saccharate formation in the batchwise process and in the continuous process alike, the raffinose is combined with quicklime and precipitated. The resultant precipitate is entrained by the saccharate cake as it is recovered and circulated. Thus, the concentration of raffinose in the molasses gradually increases and eventually reaches a level at which the recovery of sucrose in the boiling and centrifugal separation step becomes infeasible from an economical point of view. Thus, it has heretofore been necessary to discharge the molasses out of the system after the raffinose content of the molasses has reached a certain level.

As techniques of sugar manufacture designed to decrease the amount of raffinose which accumulates in molasses and is circulated in the system, there have heretofore been suggested a process resorting to the use of strontium and a process relying on use of barium, for example. These methods have been only scarcely put into practice, however, because of factors, which are disadvantageous from an economical point of view.

Regarding the addition of quicklime to molasses wherein sucrose combines with lime and precipitates in the form of calcium saccharate, there has been proposed a process whereby the quicklime is added piecemeal and the precipitate produced by the addition of the first portion of quicklime, and therefore possessed of the highest raffinose concentration, is separated and withdrawn from the system. Using this process, however, it is difficult in practice to accomplish perfect separation and removal of raffinose alone, since sucrose is also precipitated in the form of a saccharate at the same time that raffinose is combined with the quicklime and consequently precipitated.

It is universally known that raffinose is hydrolyzed by α-galactosidase into sucrose and galactose. A method for commerical production of α-galactosidase by microorganisms, particularly fungi (molds) (U.S. Pat. Nos. 3,647,625, 3,832,284 and 3,867,256), has already been developed and is finding utility in the best sugar manufacturing industry.

SUMMARY OF THE INVENTION

An object of the present invention is to provide an improved method for the manufacture of beet sugar, which incorporates a step for continuous hydrolysis of raffinose by α-galactosidase into the process of beet sugar manufacture, whereby waste molasses is not discharged and sucrose of high quality can be recovered.

Another object of the present invention is to provide an improved method for the manufacture of beet sugar, whereby the amount of the molasses required to be circulated through the system of a beet sugar plant of fixed production capacity is smaller than in an equivalent plant operated by the conventional method and, therefore, the amount of beets to be treated per day can be increased while at the same time the amount of beets to be sliced per day can be substantially fixed at a constant level throughout one campaign, thereby permitting the recovery of sucrose to be effected with high efficiency.

To accomplish the objects described above, the present invention provides an improvement in the process for manufacturing beet sugar by first purigying beet juice, then concentrating the purified beet juice, recovering sucrose from the concentrated beet juice in a boiling and centrifugal separation step, treating the molasses remaining after the centrifugal separation of sucrose from massecuite in a calcium saccharate-forming step and returning the resultant saccharate cake to the purification step, which improvement comprises adding α-galactosidase to the molasses resulting from the centrifugal separation of sucrose, thereby hydrolyzing the raffinose present in the molasses, continuously adding quicklime in the calcium saccharate-forming step to the resultant raffinose hydrolyzate to form a saccharate, continuously withdrawing from the calcium saccharate-forming step substantially the same amount of saccharate-containing solution as the amount of the raffinose hydrolyzate fed to said calcium saccharate-forming step, filtering and washing the withdrawn solution and delivering the resultant succharate cake to the step for purification of the beet juice, and at the same time continuously withdrawing from the saccharate-forming step the saccharate-containing solution in a volume of from three to 10 times that of the raffinose hydrolyzate fed to the calcium saccharate-forming step, cooling the withdrawn solution and returning the cooled liquid to the calcium saccharate-forming step.

By combining the hydrolysis of raffinose step and the continuous calcium saccharate formation step, and by treating the molasses resulting from the centrifugal separation of sucrose in these combined steps, the raffinose present in the molasses which is in circulation is constantly decomposed, permitting sucrose of excellent quality to be recovered in an amount more than what would be expected and enabling the yield of sucrose to be increased. Accordingly, the amount of the molasses required to be circulated through the steps decreases to the extent that the individual steps need not operate at full capacity, indicating that the amount of beets to be sliced can be proportionally increased. In other words, when the overall amount of beets to be treated is fixed, the number of days required for the treatment can be decreased.

Such a decrease in the number of days required for beet treatment results in a lowered degradation of the quality of raw beets during storage and in an increased savings in personnel expense, power expense, etc.

Other objects and characteristic features of the present invention will become apparent from the description given in further detail herein below with reference to the accompanying drawing.

BRIEF EXPLANATION OF THE DRAWING

The drawing is a flow sheet illustrating one preferred embodiment of the processes for the manufacture of beet sugar according to the present invention.

DETAILED DESCRIPTION OF THE INVENTION

Referring to the drawing, beets are washed, sliced and soaked in hot water to have the sucrose component extracted therefrom. The beet juice thus obtained is mixed with the saccharate cake which will be described herein below. The resulting mixture is delivered to the purification step, wherein at first it is saturated with carbon dioxide gas. As a result, the lime contained therein is converted into calcium carbonate and precipitated and the sucrose which was combined with the lime is released into its free state. At this time, insoluble proteins, colloidal matter and other similar impurities are adsorbed on the calcium carbonate with is precipitating. By removing the precipitate thus formed through filtration, the juice is purified in a clear state. If necessary, the clear juice is treated with sulfur dioxide gas and ion-exchange resin for decalcification. The clear juice is then concentrated in an evaporation step. The concentrated sugar solution is then boiled to crystallize the sucrose. In the centrifugation step, the crystallized sucrose is separated from the massecuite as the product. In the ordinary process of sugar manufacture, the boiling, and centrifugal separation step is carried out in a total of from three to five stages. Although the molasses remaining after the separation of sucrose in the final stage still contains nearly a 50% sucrose component, the sucrose purity thereof is too low to permit economically advantageous of sucrose crystals.

For that reason, this waste molasses has heretofore been subjected to the batchwise calcium saccharate process, wherein it is diluted, then cooled to a temperature below 15° C, and treated with quicklime to cause the remaining sucrose to precipitate as saccharate. The saccharate formed is separated from the mother liquor by filtration, washed and returned to the purification step.

Since the operation of the batchwise calcium saccharate process described above is complicated, there has been proposed a continuous calcium saccharate process by way of improvement. According to the continuous calcium saccharate process, diluted waste molasses is continuously supplied to a reactor provided with an agitator, wherein it is brought into contact with quicklime under agitation to produce the saccharate. The resultant saccharate-containing solution is filtered and washed and the saccharate cake consequently obtained is returned to the purification step. At the same time, the saccharate-containing solution is withdrawn from the reactor in an amount from three to 10 times that of the molasses fed into the reactor. The withdrawn solution is cooled and thereafter recirculated to the reactor.

In either of the processes described above, however, the raffinose contained in the molasses combines with the lime in a manner similar to sucrose. The resulting raffinosate is returned to the purification step together with the saccharate cake and repeatedly through all the steps. Thus, the raffinose continues to accumulate in the molasses and, after the raffinose concentration in the molasses has exceeded a certain level, the molasses must be withdrawn from the reaction system to have the raffinose concentration lowered as required. If the molasses must be withdrawn each time the raffinose concentration therein has exceeded a fixed level, then the surcrose still remaining in the withdrawn portion of molasses can no longer be recovered as a matter of course. Besides, these processes entail the disadvantageous requirement of having to regulate the amount of beets to be sliced in accordance with the amount of molasses in the process since the amount of molasses capable of being treated in each step is approximately fixed. To be more specific, the amount of beets to be sliced simply has to be increased immediately after the molasses has been withdrawn because of the increased raffinose content. When the molasses is in a saturated state in each step, however, the amount of beets to be sliced must be decreased in proportion to the amount of sucrose recovered.

The present invention provides a method wherein there no longer is waste molasses to be discharged, wherein the amount of beets to be sliced is maintained at a practically constant level and wherein the sucrose contained in the sliced beets is efficiently recovered substantially in its entire amount. This process requires that the molasses remaining after the separation of sucrose be subjected to a treatment for raffinose hydrolysis prior to the treatment by the continuous calcium saccharate process.

Specifically, the molasses content is adjusted to from 20° to 50° Brix (equivalent to about 12 to 36% of sucrose content). Thereafter, in the step for raffinose hydrolysis, microorganic cells containing α-galactosidase are added to hydrolyze the raffinose contained in the molasses. The reaction described above is carried out under the same conditions as those of the reaction of the aforementioned known method: The pH is kept in the rage of from 4.5 to 7, the reaction temperature in the range of from normal room temperature to 55° C and the amount of α-galactosidase to be added in the range of from 1-million to 16-million units per gram of raffinose. When the reaction is carried out under these conditions for 1 to 6 hours, 40 to 80% of the raffinose present in the molasses is hydrolyzed to sucrose and galactose.

Microorganic cells containing α-galactosidase are obtained when a fungus (mold) belonging to a genus such as Mortierella, genus Absidia or genus Circinella, is cultured in a medium containing specific inducing substances which enables formation of α-galactosidase in the microorganic cells. Examples of the microorganisms which are usable for this purpose include *Mortierella vinacea* var. raffinoseutilizer (ATCC 20034), *Circinella muscae* (Berlese et de Toni) nova typica coreanus (ATCC 20394) and *Absidia reflexa van Tighem* (IFO 5874). It is desirable to use a continuous reactor for said hydrolysis of raffinose, such as a vertical continuous reactor having a packed column of the microorganic cells containing α-galactosidase, and adapted to permit continuous feeding of the molasses from the top and allow the reaction solution to be discharged through the bottom thereof. This may also be used a horizontal continuous reactor containing the microorganisms having α-galactosidase and adapted to permit continuous passage of the molasses through the reactor (such as is disclosed by U.S. Pat. No. 3,664,927).

The solution containing raffinose, having undergone hydrolysis as described above, is cooled as required, then adjusted to a sugar concentration in the range of from 6 to 20% and thereafter forwarded to the step for continuous calcium saccharate formation. It is commercially advantageous to forward a raffinose hydrolyzate of higher polarization to the above step since a large volume of the hydrolyzate can then be treated.

When the molasses to be supplied to the step for raffinose hydrolysis is adjusted in advance to a sugar content of from 6–20%, at which content the continuous calcium saccharate process is operated, the raffinose hydrolyzate can be delivered in its unmodified form to the step for continuous calcium saccharate formation, rendering the operation highly advantageous from a commercial standpoint.

The equipment for use in the step for continuous calcium saccharate formation is composed principally of a reactor and a system for circulating the reaction solution. In the reactor, the raffinose hydrolyzate which is continuously received is mixed with quicklime under agitation so that sucrose and calcium oxide are combined to produce calcium saccharate. The saccharate-containing solution is continuously withdrawn from the reactor. A part of the solution, in an amount substantially equal to that of the raffinose hydrolyzate being supplied to the reactor, is forwarded to the step for filtration and washing. The remaining portion of the saccharate-containing solution is transferred, through the circulation system consisting of circulation pipes, cooling units and pumps, into the reactor so that the temperature of the saccharate-containing solution in the reactor is lowered to less than 20° C. As long as it is possible to maintain the temperature of the saccharate-containing solution below said temperature, not all of the saccharate-containing solution being circulated need be cooled. A part of it may be returned to the reactor in its uncooled state while only the remaining part thereof has to be cooled en route to the reactor. When the saccharate-containing solution is to be returned to the reactor, it may be mixed with a fresh supply of raffinose hydrolyzate on its way to the reactor or it may be delivered to the reactor separately. Additionally, quicklime may be added to the mixture of the circulation solution and the raffinose hydrolyzate prior to delivery to the reactor or it may be delivered directly to the reactor separately from the mixture.

The saccharate particles present in the saccharate-containing solution increase in diameter in proportion to the increasing volume or amount of the solution being circulated to the reactor. Nevertheless, the amount of the solution being discharged and recirculation to the reactor will be sufficient if in the range of from three to ten times the amount of the raffinose hydrolyzate being supplied to the reactor. By having such a large amount of saccharate-containing solution circulated to the reactor, the saccharate particles are allowed to achieve gradual growth, and the unaltered sucrose in the circulating solution combines with the lime to form saccharate and, thus, the unaltered lime is utilized in the combination with sucrose. This means that the ratio of sucrose recovery can be enhanced by the effective utilization of lime.

When the saccharate-containing solution is circulated in a large volume as described above, since said solution has its pH value adjusted by addition of sulfuric acid in the step for raffinose hydrolysis and therefore contains sulfate ions, there is a fair possibility that the sulfate ions will react with quicklime. This reaction will result in accumulation of scale (mixtures of saccharate, calcium sulfate, etc.) in the reaction system. Especially when this accumulation of scale occurs on the perforated screen (usually about having perforations about 3mm in diameter) disposed on the circulating solution outlet pipe of the reaction tank or within the cooling unit, smooth circulation of the solution is impeded and the operational efficiency of the cooling unit is degraded. The present invention precludes the aforementioned disadvantages due to such scale accumulation by using a lattice-work screen having a spacing of about 5 × 125mm in place of said perforated screen, and also by allowing the cooling unit to be backwashed at fixed intervals with the acidic and uncooled raffinose hydrolyzate as indicated by the dotted line in the drawing. The washings resulting from this backwashing are delivered in conjunction with the raffinose hydrolyzate to the reactor.

The amount of quicklime required is not less than 95% by weight, generally in the neighborhood of 120% by weight, as effective (active) calcium oxide based on the total weight of sucrose and raffinose present in the raffinose hydrolyzate. If the reaction temperature is too high, the reaction does not proceed uniformly. For this reason, the large volume of saccharate-containing solution being circulated in the present invention is cooled en route to the reactor, whereby the raffinose hydrolyzate being delivered is cooled; the heat evolved because of the reaction is absorbed; and the reaction is able to proceed easily under a favorable temperature condition, namely, at a temperature kept below 20° C. It is because of the adoption of this principle of cooling that the treatment of a solution having a higher sugar concentration than is acceptable for the batchwise process is rendered feasible by the process of this invention.

Since the amount of the saccharate-containing solution delivered to the step for filtration and washing is substantially equal to that of the raffinose hydrolyzate being delivered to the reactor, the amount of the saccharate-containing solution in the reactor is constant and the amount of the raffinose hydrolyzate being supplied is one third to one tenth of the amount thereof being circulated in the reactor. Since the saccharate-containing solution is therefore circulated generally three to ten times through the reactor, the saccharate particles contained therein gradually gain in size to a final value in the range of from 30μm to 40μm.

The saccharate-containing solution which is delivered to the filtration and washing step is first separated into the saccharate cake and the mother liquor and then is subjected to washing. Since the saccharate particles have a large size, the separation thereof by filtration is accomplished easily. In the washing operation, since the total surface area of the saccharate particles is small, the amount of water available for washing a unit surface area is large as compared with that available in a washing using an equivalent amount of small particles having a large total surface area. Thus, the washing is carried out effectively. Typical apparatus which can be used for this filtration and washing step, includes a horizontal belt-type suction filtration washing systems which permits filtration and washing to be performed continuously with high efficiency. Since this system is especially designed to provide uniform washing, use of this system permits one to obtain saccharate cake of uniform quality and high purity. The saccharate cake obtained in consequence of the filtration and washing is mixed with the fresh supply of beet juice and is then subjected to purification, followed by the aforementioned series of treatments.

The mother liquor which has been separated from the saccharate cake in the filtration step is further heated to cause the sucrose remaining therein to combine with the lime in the mother liquor. The resultant saccharate is filtered and washed and, in conjunction with the aforementioned saccharate cake, mixed with the fresh beet juice. Before the saccharate-containing solution is supplied to the filtration and washing step, it may be fed into a sedimentation tank wherein the unreacted lime settles to the bottom. The sedimented lime may then be added to the raffinose hydrolyzate being supplied to the reactor. This addition serves to heighten the lime concentration in the hydrolyzate and, consequently, enables the raffinose hydrolyzate containing a high sugar concentration to be treated more effectively in the reactor than when the sedimented lime is not added.

In the manner described above, the raffinose content of the final molasses in the boiling step (i.e., the molasses entering the step for raffinose hydrolysis) is controlled to a level below 5% on a dry basis, the recovery ratio of sucrose in the calcium saccharate treatment step is increased and the ratio of removal of non-sugar substances is enhanced. Consequently, the recovery of sucrose proceeds effectively in the boiling and centrifugal separation step. As a result, the amount of molasses remaining after said centrifugal separation decreases. Thus, the amount of beets to be sliced per day can be increased. Further, the fact that the amount of sugar solution circulated through the system is roughly fixed means that the amount of beets to be sliced can be maintained at a fixed level. In addition, maintaining the sucrose content of the molasses, which is subjected to the treatment for raffinose hydrolysis, in the range of from 12 to 20% proves to be highly economical, since the resulting hydrolysate can be continuously fed into the calcium saccharate conversion step without need for dilution.

For example, when molasses withdrawn from the third boiling and centrifugal separation step which had the composition shown in Table 1 was processed by the method of this invention, the conventional calcium saccharate batchwise process, the continuous calcium saccharate process and the treatment for raffinose hydrolysis followed by the conventional batchwise calcium saccharate process, respectively, the results were as shown in Table 2. The ratio of raffinose hydrolysis obtained in the raffinose hydrolysis step was 52.4%. The hydrolyzate resulting from the treatment for raffinose hydrolysis showed a viscosity (determined by an Ostwald's viscosimeter) about 10% lower than that of the untreated molasses.

Table 1

| | |
|---|---|
| Brix | 83.5° |
| Sugar content (polarization) | 54.61 % |
| Apparent sucrose purity | 65.40 % |
| Raffinose on Brix | 5.04 % |
| Sucrose content | 46.81 % |
| True sucrose purity | 56.06 % |

Table 2

| Type of reaction | Process by this invention | Batchwise calcium saccharate process | Continuous calcium saccharate process | Raffinose hydrolysis + batchwise calcium saccharate process |
|---|---|---|---|---|
| Sugar content of beet molasses (%) | 12 | 6 | 12 | 6 |
| Amount of effective lime added (% by weight on sucrose + raffinose) | 128 | 128 | 128 | 128 |
| Reaction temperature (° C) | 14 | 14 | 14 | 14 |
| True sucrose purity of saccharate cake (%) | 80.47 | 74.60 | 76.69 | 76.70 |
| Apparent sucrose purity of saccharate cake (%) | 87.38 | 88.93 | 90.72 | 85.13 |
| Recovery ratio of sucrose recovered | | | | |

Table 2-continued

| Type of reaction | Process by this invention | Batchwise calcium saccharate process | Continuous calcium saccharate process | Raffinose hydrolysis + batchwise calcium saccharate process |
|---|---|---|---|---|
| in saccharate cake (%) | 97.1 | 93.0 | 94.2 | 93.5 |
| Recovery ratio of crystalline sucrose from saccharate cake (%) | 69.1 | 56.7 | 61.3 | 61.3 |
| Recovery ratio of crystalline sucrose from molasses (%) | 67.1 | 52.7 | 57.7 | 57.3 |
| Filtering velocity | 1704 | 234 | 1217 | 296 |
| Ratio of filtering velocity based on the filtering velocity in batchwise process taken as 1 | 7.3 | 1 | 5.2 | 1.3 |

In the preceding table, the ratio of recovery of sucrose crystals from the saccharate cake is calculated based on the assumption that the true sucrose purity of the third molasses has reached 56.0%. The filtering velocity is expressed in terms of the amount of saccharate cake solids (kg) capable of being filtered per unit area of filtration ($m^2$) per unit time (hour).

It is seen from Table 2 that while the true sucrose purity of the saccharate cake was 74.60% for the conventional batchwise calcium saccharate process, it increases slightly to 76.69% for the continuous calcium saccharate process and to 76.70% for the treatment of raffinose hydrolysis followed by the conventional batchwise process but increased markedly to 80.74% for the process of the present invention. The ratio of recovery of sucrose in the form of saccharate cake was 93.0%, 94.20% and 93.5%, respectively for the conventional batchwise process, the continuous calcium saccharate process and the treatment of raffinose hydrolysis followed by the conventional batchwise process, with a slight increase displayed in the case of the continuous calcium saccharate process, whereas it notably increased to 97.1% in the case of the process of this invention.

According to the process of the present invention, the true sucrose purity of the saccharate cake is strikingly high and the ratio of recovery of sucrose in the form of saccharate cake is notably high as described above. A possible reason for the remarkable improvements thus made may be that, according to the process of this invention, the filtering velocity is decidedly much higher compared with the filtering velocity attained by any of the other methods. Since the molasses which has undergone the treatment for raffinose hydrolysis can be filtered at a notably increased velocity owing to its lowered viscosity, and since such a marked increase in the filtering velocity implies improved separation of the mother liquor (i.e., an increased amount of mother liquor separated under fixed conditions during unit time), the true sucrose purity of the saccharate cake is increased and the area requirement for the filter cloth in the filtering device is decreased proportionally.

Because of the shortness of the time spent for filtration and washing, the amount of sucrose migrating into the filtrate and washings is small. This may possibly explain why the ratio at which sucrose is recovered in the form of saccharate cake is markedly high.

According to the process of this invention, the ratio at which the sucrose present in the saccharate cake is recovered as crystalline sucrose in the boiling and centrifugation step is very high because the true sucrose purity in the saccharate cake is high, while the ratio at which crystalline sucrose is recovered from the molasses is conspicuously increased because the ratio at which sucrose is recovered in the form of saccharate cake is high.

To be specific, while the ratio of recovery of sucrose from molasses is 52.7% in the case of the conventional batchwise process, it is increased to 57.7% in the case of the continuous calcium saccharate process and to 57.3% when the treatment for raffinose hydrolysis is combined with the batchwise calcium saccharate process. In the case of the process of the present invention, this ratio is startlingly increased to 67.1%. This increase in the ratio far exceeds the sum of the increments ascribable to the improvement of the batchwise process by the continuous calcium saccharate process and the increment brought about by incorporating the treatment for raffinose hydrolysis into the batchwise process.

To be more specific about the amount of sucrose to be recovered, when 100 tons of molasses having the composition of Table 1 is treated by each of the four processes described in Table 2, the amounts of sucrose recovered are as shown in Table 3.

Table 3

| Type of reaction | Yield of sucrose (t) |
|---|---|
| Process by this invention | 32.39 |
| Batchwise calcium saccharate process | 24.67 |
| Continuous calcium saccharate process | 27.01 |
| Raffinose hydrolysis + batchwise process | 27.66 |

It is seen from Table 3 that the amount of sucrose recovered by the continuous calcium saccharate process represents an increment of 2.34 tons and that by the raffinose hydrolysis + batchwise process an increment of 2.99 tons respectively over that by the batchwise process, whereas the increment obtained by the process of the present invention is 7.49 tons, a value greater than the sum of the two increments mentioned above.

The above explanation has presumed a treatment of molasses produced in one type of beet sugar manufacturing plant. Of course, the process of the present invention can be applied with similar effectiveness to the treatment of mixtures of molasses available from different beet sugar manufacturing plants.

As is clear from the foregoing description, the present invention incorporates the step for hydrolysis of raffinose by α-galactosidase into the continuous calcium saccharate process and, consequently, enables the amount of beet sliced to be increased and the ratio of recovery of sucrose to greatly exceed the level which would be expected in the case of a simple combination of said two processes. Further, since all the operation steps involved can be carried out continuously and a molasses of higher sugar content than that of the batchwise process can be treated, the amount of molasses which can be handled effectively by the equipment of a fixed operational capacity is larger and the treatment operation is simpler (so as to decrease the manpower requirement and permit completely automated or unattended operation of the process) than that for any other conventional process. Moreover, the amount of waste water resulting from the filtration and washing of the saccharate cake is conspicuously small and the possibility of environmental pollution by the waste water effluent is diminished. Thus, the process of the present invention can be practiced quite advantageously from a commercial point of view.

The following causes may be theoried to explaine the notable increase in the yield of sucrose. The sucrose purity of the saccharate cake is improved because the saccharate-containing solution is circulated in an amount large enough to increase the size of the saccharate particles formed to the extent of improving the filterability of the saccharate particles and permitting the washing to be effected advantageously. The sucrose purity of the saccharate cake is unexpectedly increased additionally because, during the hydrolysis of raffinose, by incorporation of the step for raffinose hydrolysis, pectic substances and other viscous substances contained in the molasses are simultaneously decomposed, for example, by the action of the enzymes present in the microorganic cells and, in consequence of this decrease in the amount of the viscous substances in the molasses, the filterability of the saccharate particles is improved and at the same time the washing is effected so thoroughly as to ensure ample removal of the mother liquor. These two reasons are believed to cooperate to bring about the notable increase in yield.

Now preferred embodiments of the present invention will be described.

EXAMPLE 1

A molasses having a composition shown in Table 4 and resulting from the centrifugal separation of sucrose in the third boiling and centrifugation step was diluted with hot water to 30 degrees Brix and adjusted with sulfuric acid to a pH of 5.0.

Table 4

| Brix | 83.5° |
|---|---|
| Sugar content (polarization) | 54.61 % |
| Apparent sucrose purity | 65.40 % |
| Raffinose on Brix | 5.04 % |
| Sucrose content | 46.81 % |
| True sucrose purity | 56.06 % |

The diluted molasses was supplied at the rate of 10 liter/hour to a horizontal continuous reactor having an inner volume of 20 liters and incorporating pellet-shaped α-galactosidase-containing cells (having an activity of 650,000 units/g), obtained by culturing $Mortierella\ vinacea$ var. raffinoseutilizer (ATCC 20034), in a medium containing lactose and glucose as carbon sources at a ratio of 4,500,000 units per g of raffinose. The contents of the reactor were agitated at about 50° C. The retention time of the diluted molasses in the reactor was about two hours. The raffinose content of the hydrolyzate continuously discharged from the reactor was about 2.40% on Brix, indicating that the ratio of raffinose hydrolysis was 52.4%.

Then the hydrolyzate was diluted to a sugar content of 12% and introduced at the rate of 16 liters/hour into a mixing tank, in which it was continuously mixed with quicklime which was added at the rate of 2.8 kg/hour. The resulting mixture was supplied to a continuous saccharate reactor. From said continuous reactor, the saccharate-containing solution was pumped out through an upper and a lower outlet each at the rate of 80 liters/hour. The saccharate-containing solution withdrawn from the lower outlet alone was cooled in a cooling unit to about 10° C. The two solutions were then returned to the mixing tank, mixed with fresh supplies of diluted molasses and quicklime and forwarded to the continuous reactor. The rate of rotation of the agitator inside the reactor was about 20 rpm and the temperature of the solution within the reactor was about 14° C.

The saccharate-containing solution was allowed to overflow the upper end of the reactor at the rate of 16 liters/hour. To test the formed saccharate for filterability and for true sucrose purity, 393g of the overflowing solution was supplied to a filtration device using a filter cloth (Nylon 9B), 0.01m$^2$ in effective area, and suction-filtered under a vacuum of −450mmHg with a vacuum pump. The cake formed on the filter cloth was washed and filtered with 63g of added washing water. The time required for this filtration and washing was 12.3 seconds. Consequently, there was recovered 109g of saccharate cake, while the total amount of the filtrate was 138g. An assay conducted on the resulting saccharate cake gave the results shown in Table 5. Calculation shows the ratio of recovery of sucrose from molasses to be 97.1%.

Table 5

| True sucrose purity | 80.47 % |
|---|---|
| Solid content | 45.7 % |
| Apparent sucrose purity | 87.38 % |
| Raffinose on Brix | 3.73 % |

It is seen from Table 5 that the ratio of the recovery of crystalline sucrose in the boiling and centrifugal separation step through the step of saccharate cake formation from the molasses was 67.1%, based on the assumption that the sugar was removed so that the sucrose purity of the third molasses was to 56.0%.

EXAMPLE 2

A crop of beets (2,065 tons, containing 310.81 tons of sucrose and 3.24 tons of raffinose) was treated throughout a season (125 days) by the process (I) of this invention. The steps for purification and concentration and the step for boiling and centrifugal separation were performed in accordance with the known method, while the step for raffinose hydrolysis, the step for continuous saccharate formation and the step for filtration and washing were carried out by following the procedure of Example 1. The results are shown in Table 6 in comparison with the corresponding values estimated from past data on assumption that the same amount of beet was treated by the conventional batchwise calcium saccharate process, the continuous calcium saccharate process and the batchwise calcium saccharate process combined with the treatment for raffinose hydrolysis.

Table 6

|  | Process by this invention | Batchwise c. s. process | Continuous c. s. process | Raffinose hydrolysis + Batchwise c. s. process |
|---|---|---|---|---|
| Yield of sucrose (t) | 36,359 | 33,914 | 34,223 | 35,813 |
| Recovery ratio of sucrose (%) | 93.58 | 87.29 | 88.09 | 92.18 |
| Amount of molasses after recovery of sucrose (t) | 18,503 | 20,709 | 20,000 | 19,243 |
| Solid content of molasses (t) | 14,728 | 16,484 | 15,920 | 15,318 |
| True sucrose purity of molasses (%) | 55.50 | 58.60 | 58.60 | 56.70 |
| Raffinose content in molasses (%) | 4.49 | 6.86 | 7.94 | 4.13 |
| Amount of molasses supplied to c. s. process (t) | 74,698 | 157,354 | 76,729 | 157,334 |
| (Polarization) | (12) | (6) | (12) | (6) |
| Solid content of molasses supplied to c. s. process (t) | 14,728 | 13,415 | 12,700 | 15,318 |
| True sucrose purity of molasses supplied to c. s. process (%) | 57.16 | 58.75 | 58.75 | 58.22 |
| Raffinose content of molasses supplied to c. s. process (%) | 2.00 | 6.28 | 7.42 | 1.84 |
| Amount of solid (other than calcium) in saccharate cake supplied to purification step (t) | 9,931 | 9,245 | 8,990 | 9,975 |
| True sucrose purity of saccharate cake (%) | 80.10 | 75.70 | 77.60 | 79.40 |
| Raffinose content of saccharate cake (%) | 2.81 | 8.10 | 9.80 | 2.51 |
| Amount of discard molasses (t) | None | 3,855 | 4,045 | None |
| Solid content of discard molasses (t) | — | 3,069 | 3,220 | — |
| True sucrose purity of discard molasses (%) | — | 57.98 | 58.00 | — |
| Raffinose content of discard molasses (%) | — | 9.39 | 9.98 | — |

Remarks:
c. s. refers to calcium saccharate. Both the true sucrose purity and the raffinose content are calculated on the basis of solid content.

It is evident from Table 6 that the amount of molasses remaining after recovery of sucrose is smaller and the sucrose purity of the molasses is lower for the process of the present invention than for any of the other three processes but that the sucrose purity of the saccharate is higher and the amount of sucrose recovered in the form of saccharate cake is greater for the process of this invention than any other process. Thus, the sucrose purity of the saccharate cake is increased to a marked extent in the process of this invention. A possible reason for this is that since the saccharate cake obtained therein has a low raffinose content and a large particle diameter and the saccharate-containing solution has a lowered viscosity, the solution can be filtered and washed at an increased velocity and the non-sugar substances can be removed to a thorough extent.

As a result, the process of the present invention permits recovery of 36,359 tons of sucrose per season. Furthermore, the actual amount of molasses to be fed to the step for calcium saccharate treatment is smaller for the process of this invention than for the continuous calcium saccharate process. For a fixed capacity of the reactor, the process of the present invention permits treatment of a larger amount of beets. Better still, the process of this invention, unlike the batchwise calcium saccharate process or the continuous calcium saccharate process, does not entail discharge of waste molasses and therefore permits such treatment to the same amount of beets every day.

What is claimed is:

1. In a process for manufacturing beet sugar comprising purifying diffused beet juice, concentrating the purified beet juice, recovering sucrose from the concentrated beet juice in a boiling and centrifugal separation step, adding quicklime to the molasses remaining after the centrifugal separation of sucrose from the massecuite to produce calcium saccharate and returning the resultant saccharate cake to the diffused beet juice-purifying step, the improvement which comprises a. adding α-galactosidase to the molasses remaining after the centrifugal separation of sucrose thereby hydrolyzing the raffinose present in the molasses into sucrose and galactose before said quicklime addition;

b. continuously adding quicklime to the resultant raffinose hydrolyzate to produce calcium saccharate;

c. continuously withdrawing from the calcium saccharate-forming step substantially the same amount of the saccharate-containing solution as the amount of raffinose hydrolyzate being fed into the calcium saccharate-forming step and forwarding the saccharate cake obtained by filtering and washing said saccharate-containing solution to the diffused beet juice-purifying step; and d. at the same time, continuously withdrawing from the calcium saccharate-forming step a second volume of the saccharate-containing solution which is three to ten times the volume of the raffinose hydrolyzate being fed into the calcium saccharate-forming step, cooling said second withdrawn solution and returning the cooled solution to the calcium saccharate-forming step.

2. The process of claim 1, wherein the molasses remaining after the centrifugal separation of sucrose is diluted to 20° to 50° Brix and the α-galactosidase is added thereto under a pH of 4.5 – 7 and a reaction temperature of 20° – 55° C.

3. The process of claim 2, wherein the α-galactosidase is added to the molasses at a rate of 1,000,000 ~ 16,000,000,000 units per g of raffinose contained in the molasses.

4. The process of claim 1, wherein the raffinose hydrolyzate is separated from the α-galactosidase contained therein and then is fed with the concentration unchanged, to the calcium saccharate-forming step.

5. The process of claim 4, wherein the molasses subjected to the treatment for raffinose hydrolysis has a polarization of 12 ~ 20% and the resultant raffinose hydrolyzate is fed, with the concentration unchanged, to the calcium saccharate-forming step.

6. The process of claim 1, wherein said second saccharate-containing solution withdrawn from the calcium saccharate-forming step is cooled to a temperature such that the reaction solution in the calcium saccharate-forming step is maintained below 20° C.

* * * * *